V. G. APPLE.
MACHINE FOR BENDING ARMATURE TERMINALS.
APPLICATION FILED DEC. 23, 1918.

1,332,154.  
Patented Feb. 24, 1920.  
8 SHEETS—SHEET 3.

Witnesses:  
Inventor  
Vincent G. Apple

V. G. APPLE.
MACHINE FOR BENDING ARMATURE TERMINALS.
APPLICATION FILED DEC. 23, 1918.

1,332,154.

Patented Feb. 24, 1920.
8 SHEETS—SHEET 7.

V. G. APPLE.
MACHINE FOR BENDING ARMATURE TERMINALS.
APPLICATION FILED DEC. 23, 1918.
1,332,154.
Patented Feb. 24, 1920.
8 SHEETS—SHEET 8.
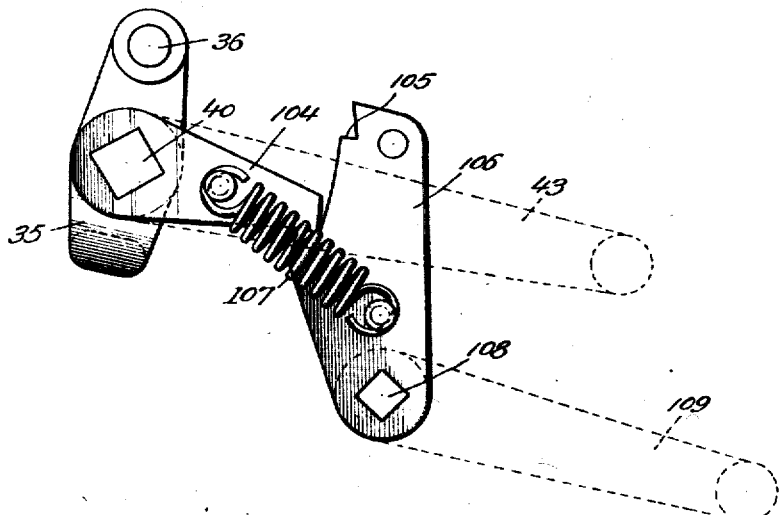
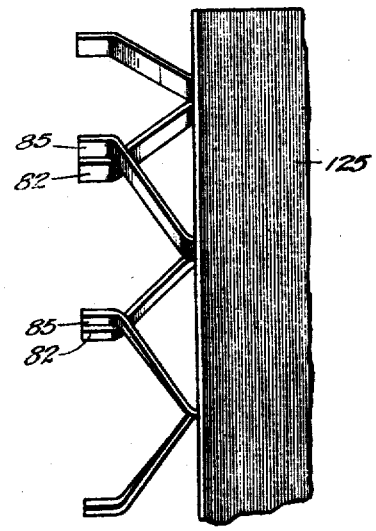
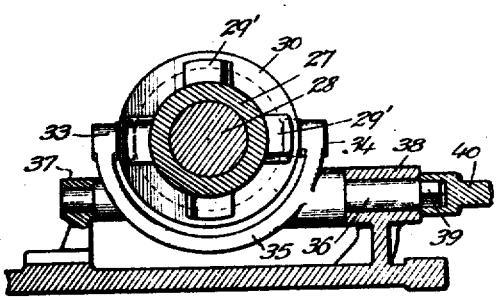
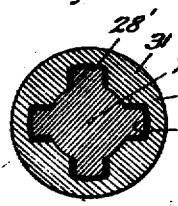

UNITED STATES PATENT OFFICE.

VINCENT G. APPLE, OF DAYTON, OHIO.

MACHINE FOR BENDING ARMATURE-TERMINALS.

1,332,154.  Specification of Letters Patent.  Patented Feb. 24, 1920.

Application filed December 23, 1918. Serial No. 268,021.

*To all whom it may concern:*

Be it known that I, VINCENT G. APPLE, a citizen of the United States, residing at Dayton, in the county of Montgomery and State of Ohio, have invented certain new and useful Improvements in Machines for Bending Armature-Terminals, of which the following is a specification.

One of the objects of my invention is to provide a power driven tool, by means of which the terminal ends of armature conductors, at one or both ends of the core, may all simultaneously and uniformly be bent into respective positions, in appropriately disposed pairs, one or both ends of which may then be connected to commutator segments.

Another object of my invention is to provide a tool, and means for adjusting it, so that the extent to which the terminals are displaced will be automatically determined to the end that the operation consecutively performed on a series of like armatures may quickly and accurately be accomplished.

The present invention provides means whereby certain power driven instrumentalities are employed to carry into effect the object sought in Letters Patent No. 1,238,959 granted to Edward J. Tomlinson for a terminal bending tool for armatures, September 4, 1917, and for making armatures, substantially as shown in my copending application Serial No. 139,753, filed December 30, 1916, wherein conductor bars project from each end of the core and which bars are intended to be subsequently bent to their respective positions and suitably paired prior to being joined together, as by welding or otherwise, and in which either of the series of ends may be connected to respective commutator sections.

Bar wound, or single turn armatures, in which the conductor terminals are bent from axial position into new circumferentially directed planes to form appropriate pairs for connection with the respective segments of armature commutators, require the services of relatively highly paid experts to accomplish this operation, when such work has been done by hand, as heretofore, and when each of the terminal wires is separately manipulated.

The armature terminal ends must be bent uniformly without vertical deviation from their initial axial planes, so as not to occupy any greater space in the aggregate, in their deflected positions, than when in their initial axial positions, to economize end room and to avoid danger of short-circuiting.

It requires a great deal of power to bend all of the terminals of an armature at one time, but in doing so, the time required for the purpose is materially shortened and uniformity of results is produced.

In my present invention I provide a machine that is capable of accurate and sufficient adjustment for the purpose and which is powerful enough to bend all of the terminals of an armature at one end, or at both ends, at the same time and so arranged that when the bending act has been performed, as desired, the bending operation may be automatically or manually stopped, after which the armature which previously had substantially straight bars projecting from the ends of the core, may be replaced by another similar one upon which the desired operation is to be formed, so that when the armature comes from the machine, the ends are in place to be joined together.

Other and further and more specific objects of my invention will become readily apparent, to persons skilled in the art, from a consideration of the following description when taken in conjunction with the drawings, wherein:

Fig. 9 is a trigger mechanism for stopping the machine in association with the clutch closing means.

Fig. 10 is a fragment of an armature core showing one set of terminals projecting from one end thereof and the manner in which they are placed in pairs.

Fig. 11 is a transverse section taken on line 11—11 of Fig. 3.

Fig. 12 is a transverse section taken on line 12—12 of Fig. 3.

In all the views the same reference characters are employed to indicate similar parts.

Figure 1:
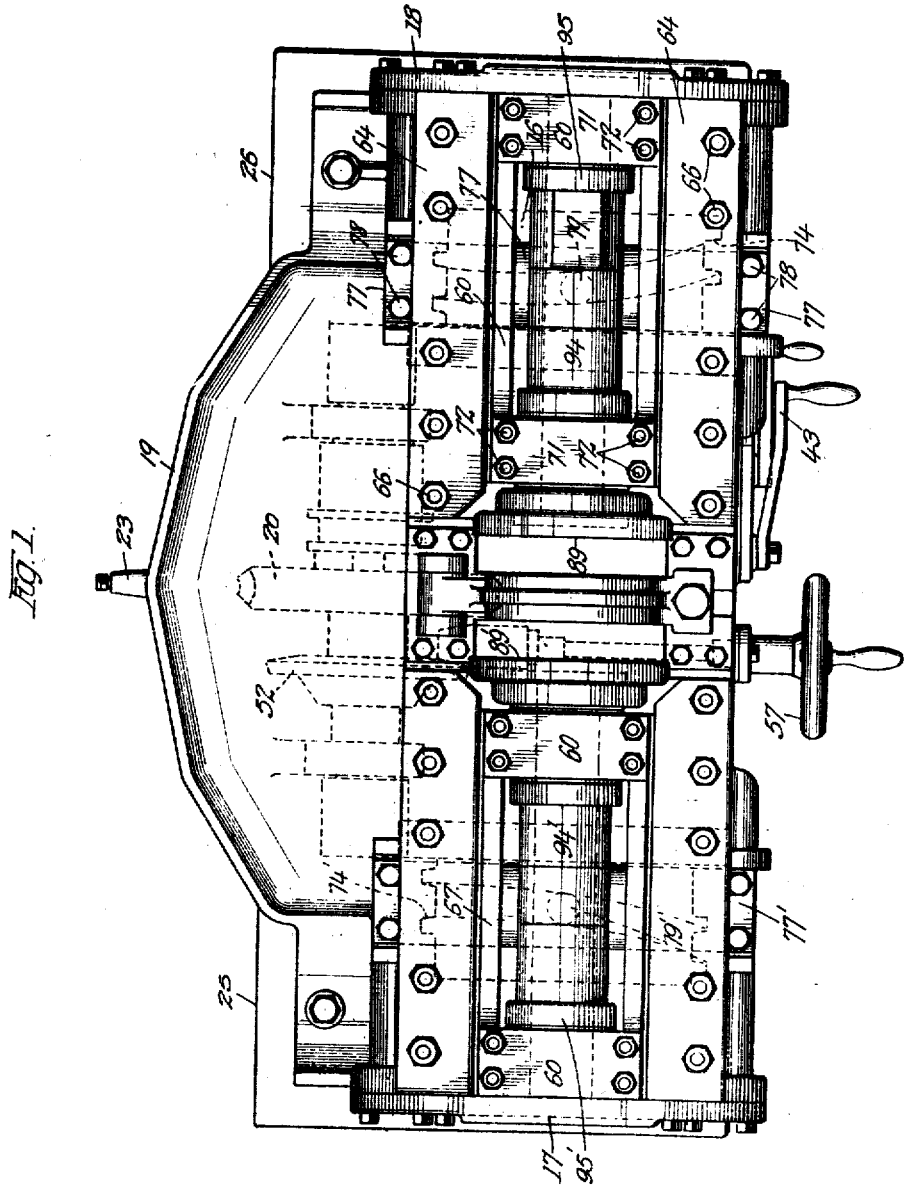
Figure 1 is a plan view of the machine.
Figure 2:
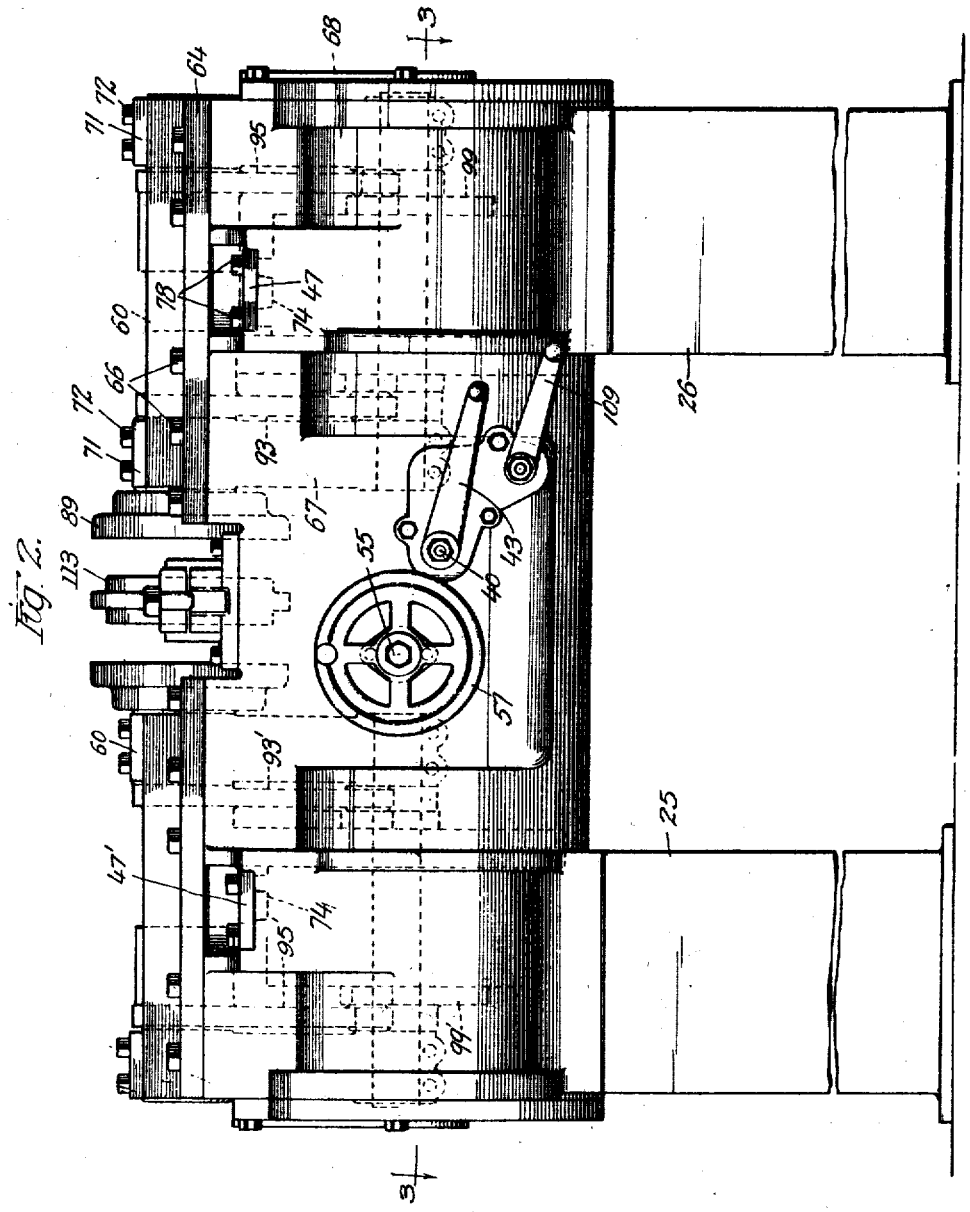
Fig. 2 is a side elevation of the machine showing the side upon which the controlling mechanism is located.
Figure 3:
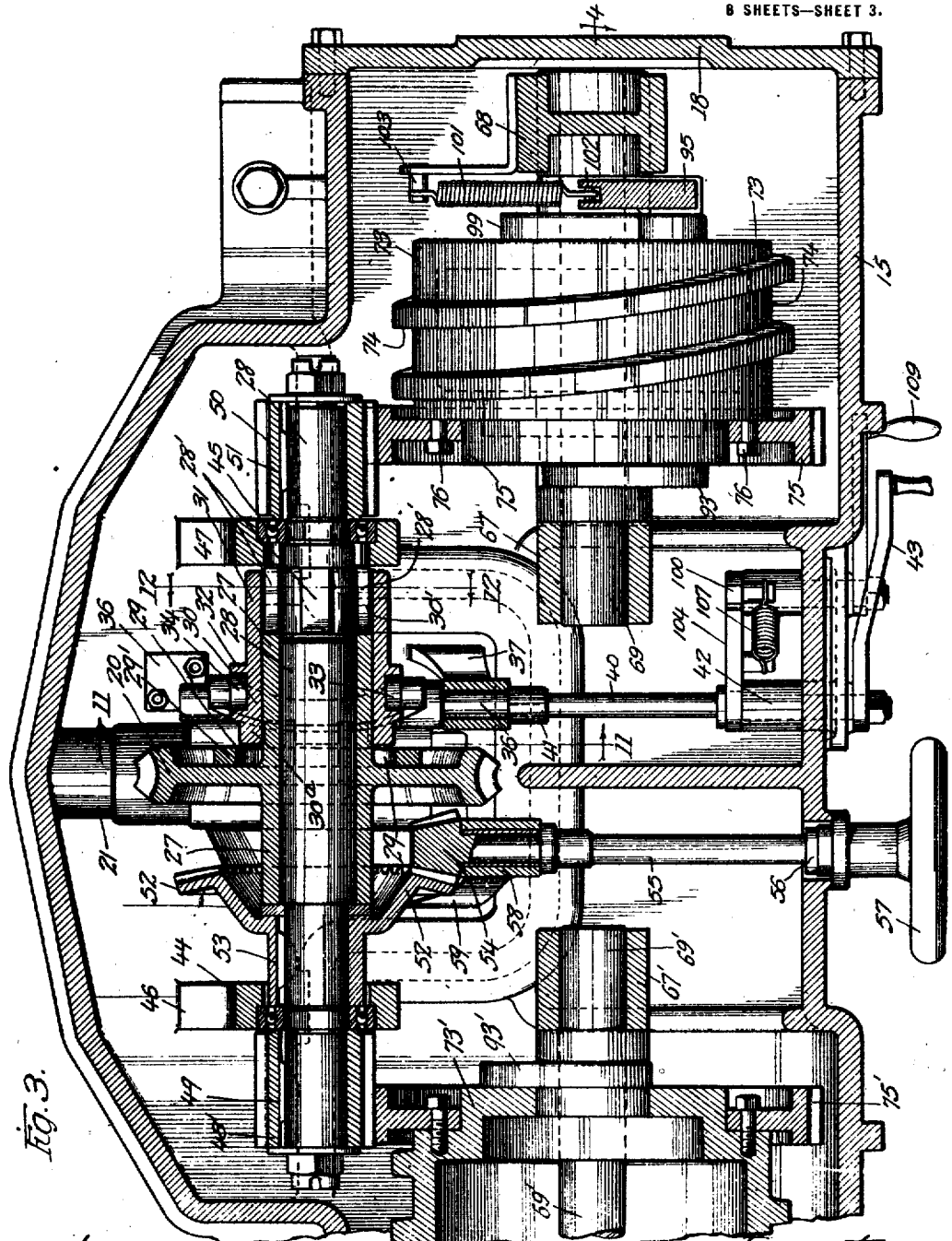
Fig. 3 is an enlarged section taken on line 3—3 of Fig. 2.
Figure 4:
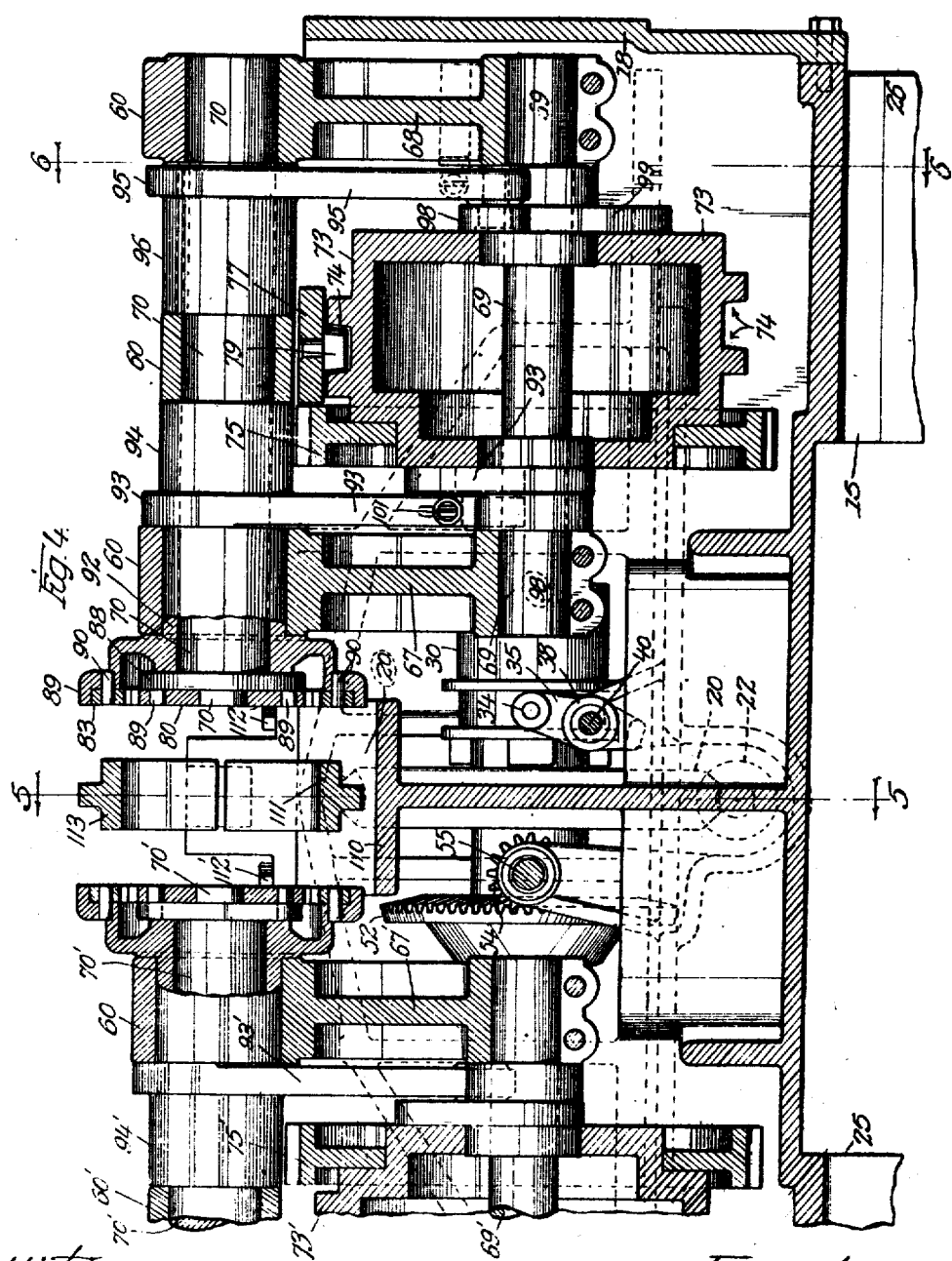
Fig. 4 is a section taken on line 4—4 of Fig. 3.
Figure 5:
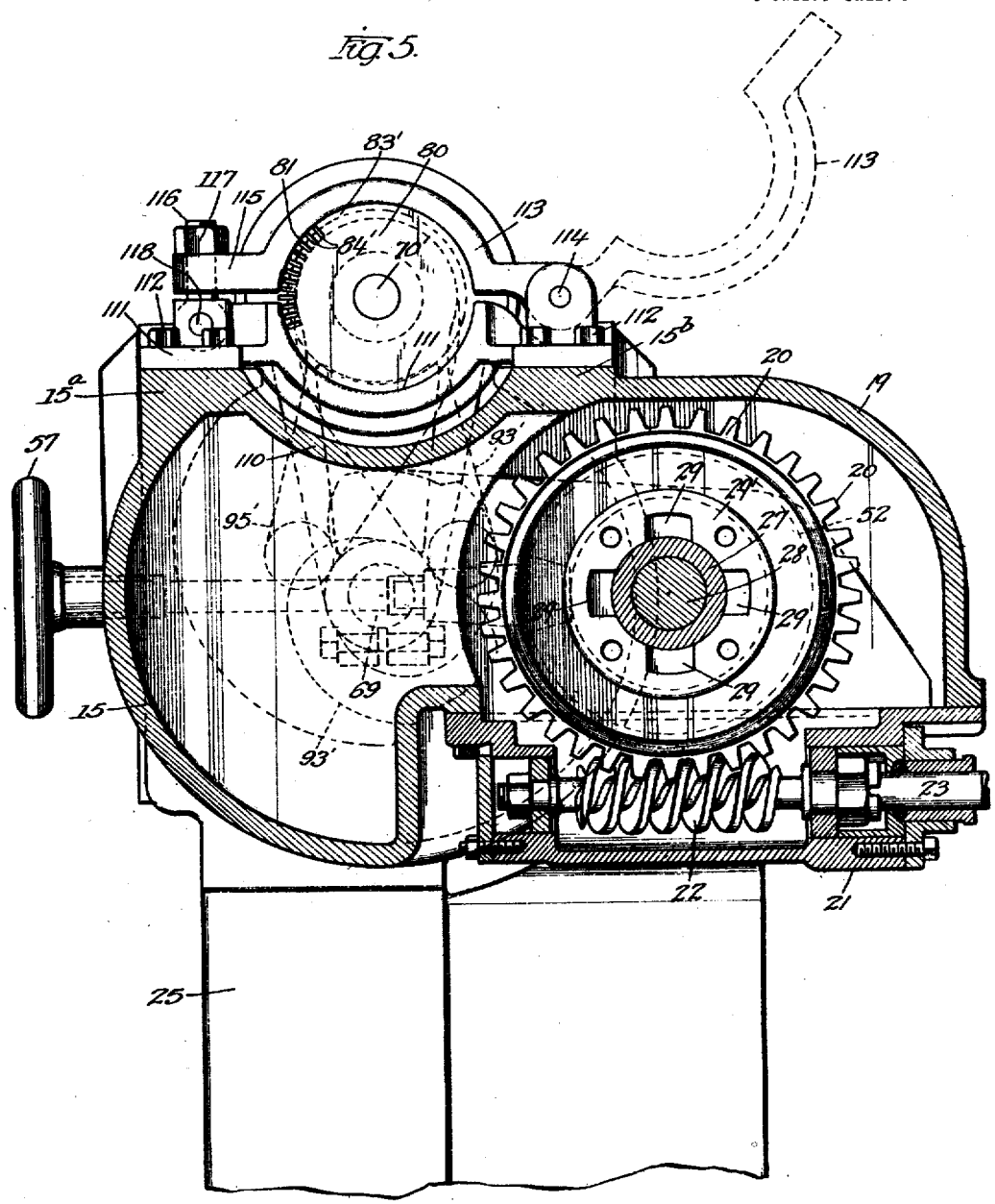
Fig. 5 is a transverse section taken on line 5—5 of Fig. 4.

A more or less cylindrical frame 15 is open along its top surface, as at 16, and is provided at its ends with removable heads 17 and 18. The frame is laterally enlarged, as at 19, to contain the driven worm wheel 20, and to the bottom of the enlarged portion 19 is bolted a casing 21 in which the driving worm 22 which rotates the wheel 20 is contained. The extended end 23 is the driving shaft through which power is to be applied to the machine. For convenience of operation the frame is mounted upon pedestals 25 and 26.

The worm wheel 20 is provided with an elongated hub 27 which is normally loose on the shaft 28. It is also provided with four apertures in the disk 29' comprising a four jawed clutch member 29. The coöperating clutch member 30 is slidable upon a shaft 28 and the elongated hub 27 thereof is prolonged into a sleeve 31. It is provided with four coöperating clutch members 30ª which enter the openings 29 near the hub 27 of the wheel 20 when the two clutch members are connected together for the purpose of driving the shaft 28. The shaft is enlarged laterally to provide four lateral projections 28',—as shown in Fig. 12—that engage openings 30' in the sleeve 31. By this means the clutch members 29 and 30 connect the worm wheel 20 with the shaft 28. The sliding clutch member 30 is laterally enlarged, as at 32, which enlargement contains an annular spiral groove within which grooves the yoke ends 33 and 34, of the yoke 35, project, for the purpose of laterally moving the clutch member 30 along the shaft 28 to connect and disconnect the clutch members when it is desirable to rotate or stop rotation of the shaft 28. A shaft 36 supports the yoke member 35, and finds bearings at its respective ends in the standards 37 and 38, which are supported in the enlargement 19, of the frame 15. The end 36 of the shaft is squared, as at 39, for a socket shaft 40. The socket 41, of the shaft 40, engages the squared end of the shaft 36 and finds bearing 42 in the frame 15. The shaft 40 is adapted to be oscillated by the operating handle 43, whereby the clutch members 29 and 30 are adapted to be brought into engagement or from engagement, in accordance with the direction in which the handle 43 is moved. This feature of the apparatus will be more fully described hereinafter.

Bearing rings 44 and 45, near the outer ends of the shaft 28, are supported in the standards 46 and 47, respectively. An elongated pinion 48' is secured to one end of the shaft by the key 49 and a similar pinion 50 is secured to the other end of the shaft, by a key 51.

A beveled gear wheel 52 is secured to the shaft 28, by a key 53, and a bevel pinion 54, meshes with the teeth of the bevel gear wheel. A shaft 55 is supported in the frame near its outer end, as at 56, and on the outer end it is provided with a hand wheel 57. Near its inner end it is supported by a bearing 58 of the standard 59, so that the shaft 28 may be rotated, by rotation of the hand wheel 57, for a purpose to be hereinafter more fully explained.

The shaft and gear wheels which I have heretofore explained, to which power is applied for driving the machine, are bodily stationary. On either side of the longitudinal center of the machine are longitudinally movable heads 60 and 60'. As these heads and the parts attached thereto are substantially duplicates, I will describe one head, referring to it and its parts by reference characters and to similar parts in the other head by the same characters with the addition of the exponent prime ('). The head 60 is provided with laterally extending guides 61 and 62, which slide upon the flat surfaces 63 of the frame that bounds the opening 16 of the frame 15. A gib plate 64 is secured to the part 65 by a series of screws 66, to permit free axial movement of the head in the guides thus afforded. Depending from the head 60, at each end, respectively, are spaced apart arms 67 and 68, which afford bearings for a shaft 69. In the head 60 is a shaft 70. The half boxes 71 are secured to the head 60 by bolts 72 to afford bearings for the shaft 70, and to hold it in place on the head.

Suitably fixed to the shaft 69 is a drum cam 73, having a circumferentially extending spiral groove 74 in its outer surface. The spur gear wheel 75 is fixed to the drum 73, by bolts 76. The gear wheel 75 meshes with the spur gear pinion 50, on the drive shaft 28. The pinion 50 is elongated so that the gear wheel 75 may be moved axially thereof without being out of mesh therewith.

Fixed to the frame 15 is a cross bar 77, secured thereto by bolts 78 and which carries at its mid-portion a roller 79 that projects into the groove 74 of the drum cam 73. Now inasmuch as the cross bar 77 is fixed to the frame, it will be apparent that when the shaft 69 is rotated through the instrumentality of the shaft 28, the pinion 50 and the gear wheel 75, that the head 60 and the connecting mechanism including the spiral cam 73, shafts 69 and 70 will be axially moved with the head and the arrangement is such that the shafts 69 and 69', 70 and 70' will be moved toward each other in one cycle of their operation and away from each other in the other cycle of operation, or in other words, when the drums 73, 73' are rotated in a manner described, one rotation of the shafts 69, 69' will serve to move the respective heads toward each other and from each other, for a purpose to be hereinafter more fully described.

Figure 6:
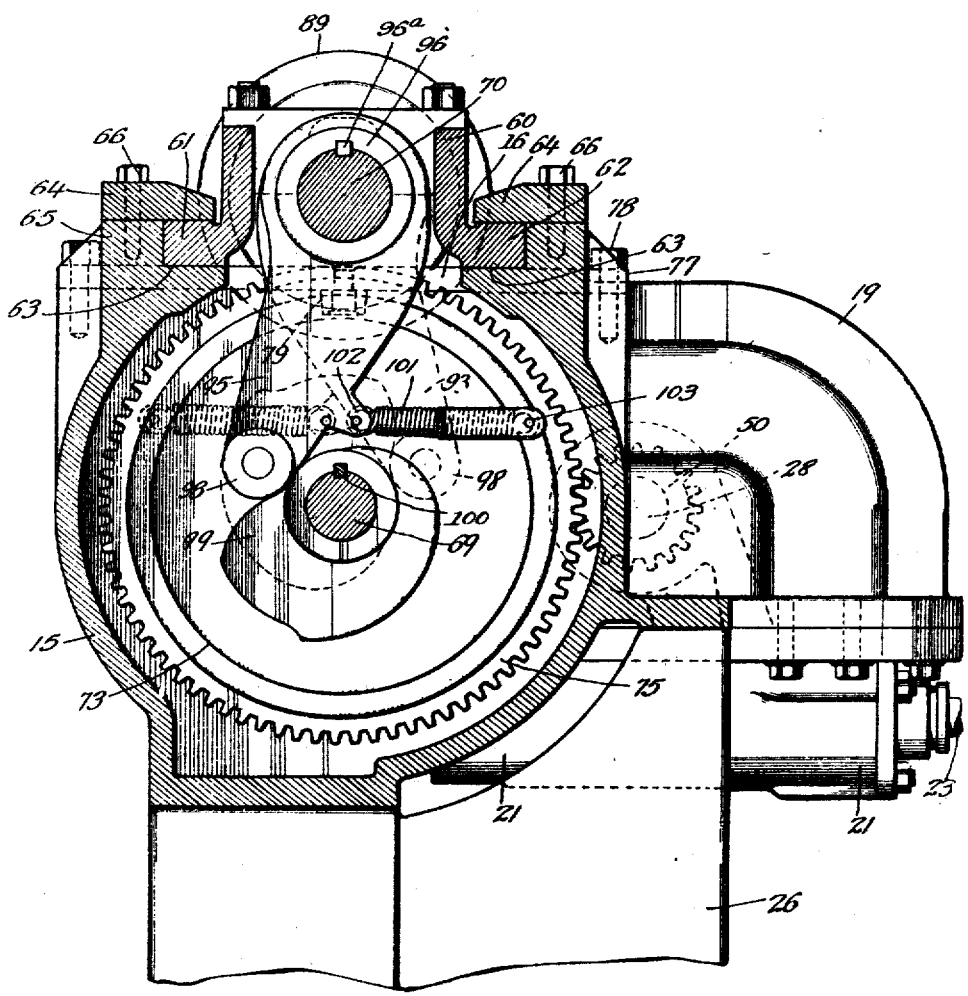
Fig. 6 is a transverse section taken on line 6—6 of Fig. 4.
Figure 7:
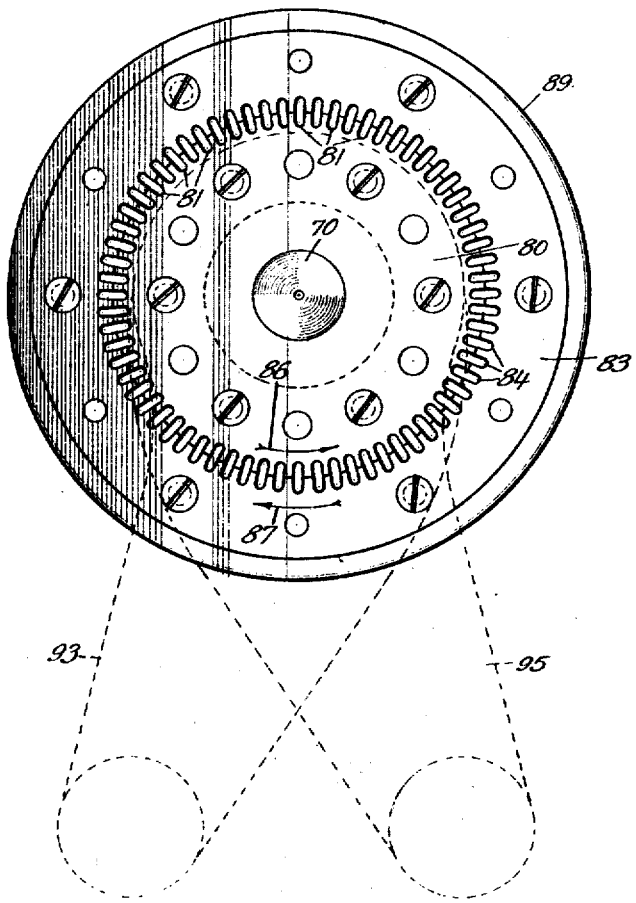
Fig. 7 is an enlarged view of a pair of the terminal bending plates or members.
Figure 8:
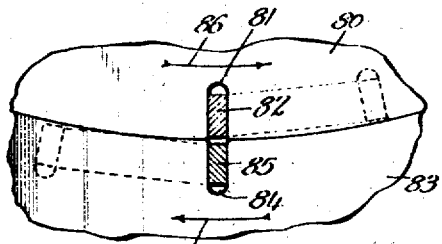
Fig. 8 is a fragment of a pair of the bending members showing a pair of armature terminals in place and the extent to which they are displaced in the finished bends.

Secured to the inner end of the shaft 70 is an armature terminal-bending member 80. The rotatable plate or member 80, more fully shown in Figs. 7 and 8, is provided with a series of grooves 81 in the periphery, properly spaced apart, to contain terminals 82 of an armature. Concentrically arranged with the bending member 80 is another bending plate or member 83, having a corresponding number of grooves 84 for containing armature terminals 85. The grooves in the members 80 and 83 are alike in number and are correspondingly uniformly spaced apart. The bending members 80 and 83 are to be oscillated in opposite direction as shown by the corresponding arrows 86 and 87. The member 80 is preferably in the form of a disk or plate that may be removably secured to the head 88, on the end of the shaft 70, as by pins 89, or otherwise, and the bending member 83 is preferably a flat ring that may be secured to the head 89, as by pins 90, or otherwise, and these members may be replaced with other pairs of members having different numbers and sizes of slots with arbitrary spacings to correspond with the windings of the armature, or the size of the bars constituting the electrical conductors placed upon the armature core. The head 89 is extended rearwardly into a sleeve 92, on which is mounted and to which is secured a downwardly depending lever 93, having an integral hub 94. A similar lever 95, having a hub 96, is suitably secured directly to the shaft 70. The lever 93 bears upon one side of the shaft 69, the lever 95 on the other side, as more clearly shown in Figs. 6 and 7. The levers 93 and 95 are each provided on their free ends, with rollers 98, and each bears upon the outer surface of their respective right and left hand cams 99. These cams are each secured to the shaft 69 by a suitable key 100. Now it will be manifest that when the shaft 69 is rotated, the shaft 70 and head 89 will be oscillated by the instrumentality of the cams 99 and the levers 98. The shaft 70 will by this means be oscillated in one direction, while the bending head 89 will be rotatably oscillated in the opposite direction, as shown by the arrows 86 and 87, in Fig. 7. A spring 101, one for each lever, has one of its ends 102 fixed to the lever and the other end, secured to a fixed part 103 of the frame, so that the rollers 98 will always be yieldingly held in contact with the face of the respective cams 99.

The handle 43, controls the clutch members 29 and 30, by means of which the gear wheel 20 is caused to revolve the shaft 28, and when in the position shown in Fig. 9, the said clutch members are disconnected. When the handle 43 is moved, for the purpose of connecting the clutch members in order that the shaft 28 may be rotated and thus drive the bending members, the lever 43 is raised until the dog 104 engages the shoulder 105, on a latch member 106. By this means the yoke member 35 is swung on the shaft 36, thus bringing the clutch members into driving relation. The end of the dog 104 will rest on the shoulder 105, being held there by the spring 107, and so long as this trigger mechanism occupies the position described, the shaft 28 will be rotated. The latch member 106 is pivoted, as at 108, and to this pivot is attached another handle 109 by which the latch member 106 may be moved. When the bending members have been rotated to the desired or proper position, in the manner described, the latch lever 109 may be manually depressed, whereby to withdraw the latch 106 from contact with the dog 104, and thereby the spring 107 will move the clutch members automatically to open position to stop the machine. It is within the skill of an ordinary mechanic to arrange means for automatically moving the latch lever 109 to accomplish this function, but for the purpose of clearness I have omitted such an apparent constructive modification from the drawings.

Midway of the frame 15 and below the horizontal opening in the upper surface thereof, is an integral bridge member 110, preferably in the shape of an inverted arch, joining the sides of the frame 15 together for greater strength, at this point. A curved armature-clamping member 111, is fixed to the sides 15$^a$ and 15$^b$ by screws 112. At one end of the clamping member 111 is pivoted a coöperating clamping member 113, as at 114, the other end 115 being held in place in coöperation with the corresponding clamping member 111, by means of a bolt 116, and a nut 117, the bolt being pivoted, as at 118, to the lower clamping member 111. Between these clamping members the armature core 125 with the straight bars projecting from one or both of its ends, is supported. The ends 82 and 85, of the armature, constituting the conductors that are to be bent into proper positions and to be joined in appropriate pairs are included in the respective apertures 81 and 84 of the bending members 80 and 83.

In order to secure proper register of the terminals with the apertures in the bending members, the shaft 28 may be turned by hand, through the instrumentality of the gear wheel 52, the bevel pinion 54, the shaft 55 and the hand wheel 57, before the clutch members 30 and 31 are brought into operative association.

After the terminals of a given armature have been bent to the extent and into the positions desired, it may be removed from the machine and another armature with straight terminals placed therein, whereupon the machine may again be put through its cycle of operation.

While I have herein shown a single embodiment of my invention for the purpose of clear disclosure it is manifest to persons skilled in the art that changes may be made in the general arrangement and configuration of the parts within the scope of the appended claims.

Having described my invention, what I claim is:—

1. A machine having in combination, means for holding an armature having axially projecting terminals; two independently rotatable parts, each part provided with a plurality of armature - terminal - engaging means, and power means, to move said terminal-engaging means to circumferentially displace said terminals and means for controlling the power means.

2. A machine having in combination, means for holding an armature having axially projecting terminals, two independently rotatable parts, each part provided with a plurality of armature - terminal - engaging means, said means, on the two parts, being revoluble in opposite directions; power means to move the said terminal-engaging means to circumferentially displace the said terminals and means to stop the rotation of said rotatable means.

3. A machine having in combination, means for holding an armature having axially projecting terminals at each of its ends; two independently rotatable parts at each end of the armature, each part provided with a plurality of armature-terminal-engaging means, and power means for simultaneously moving said terminal-engaging means to circumferentially displace the terminals to form appropriate pairs thereof and means for controlling the power means.

4. A machine having in combination, means for holding an armature having axially projecting terminals at each of its ends; two independently rotatable parts at each end of the armature, each part provided with a plurality of armature-terminal-engaging means for engaging the respective terminals; power means to simultaneously move said terminal-engaging means to circumferentially displace the terminals to form appropriate pairs thereof and means to stop movement of the rotatable parts.

5. A machine having in combination, means for holding an armature having axially projecting terminals; two independently rotatable parts, each part provided with a plurality of armature-terminal-engaging means, said means on the two parts being revoluble in opposite directions; power means to move said terminal-engaging means to circumferentially displace said terminals and means to stop movement of said rotatable parts.

6. A machine having in combination, means to hold an armature having axially projecting terminals; a head containing a terminal-engaging part rotatable in one direction; another head, containing a terminal-engaging part rotatable in the opposite direction; power driving means to rotate said heads; means for connecting said heads to said driving means; a latch to maintain the connection and a spring and connection to actuate said means to disconnect the heads from said power driving means when the latch members are disengaged.

7. A machine having in combination, means to hold an armature having axially projecting terminals; a head containing a terminal-engaging part rotatable in one direction; another head, containing a terminal-engaging part rotatable in the opposite direction; power driving means to rotate said head; means to move the heads toward the armature while being rotated; and means for connecting said heads to said driving means.

8. A machine having in combination, means to hold an armature having axially projecting terminals; a head containing a terminal-engaging part rotatable in one direction; another head containing a terminal-engaging part rotatable in the opposite direction; power driving means to rotate said heads; means to move the heads toward the armature while being rotated; means for connecting the said heads to the said driving means, and means to quickly disconnect said driving means and heads when the armature terminals have been circumferentially displaced by the said heads.

9. A machine having in combination, means to hold an armature having axially projecting terminals; a head containing a terminal-engaging part rotatable in one direction; another head containing a terminal-engaging part rotatable in the opposite direction; means to adjust the heads with respect to the terminals; power driving means to rotate the said heads; means to move the heads toward the armature while being rotated; means for connecting the said heads to the said driving means and means to quickly disconnect said driving means and heads.

In testimony whereof I hereunto subscribe my name.

VINCENT G. APPLE.